Dec. 9, 1930.  C. C. SCHMIDT ET AL  1,784,547
HYDRAULIC BRAKE MECHANISM
Filed May 5, 1928    3 Sheets-Sheet 1
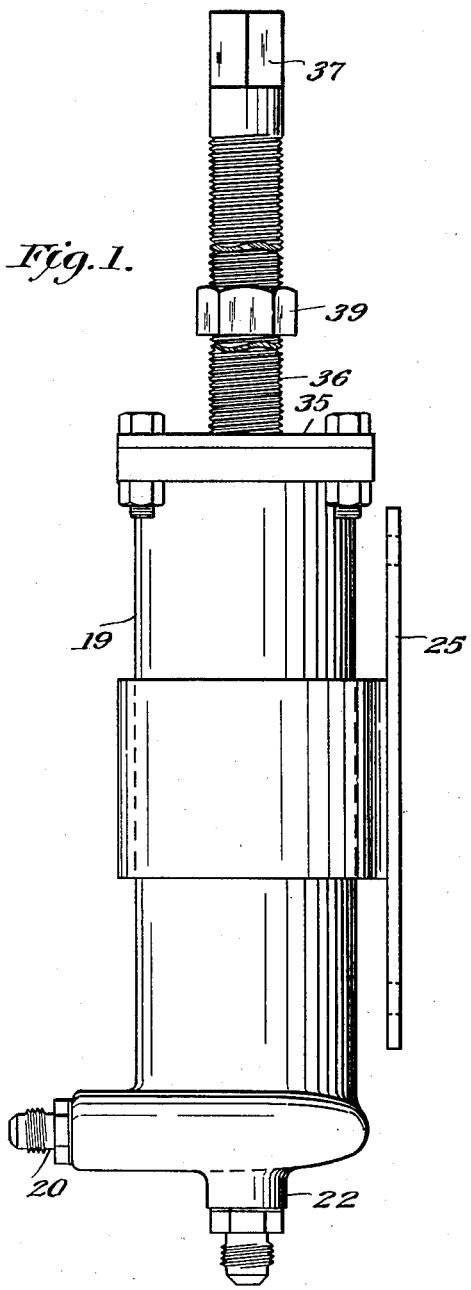
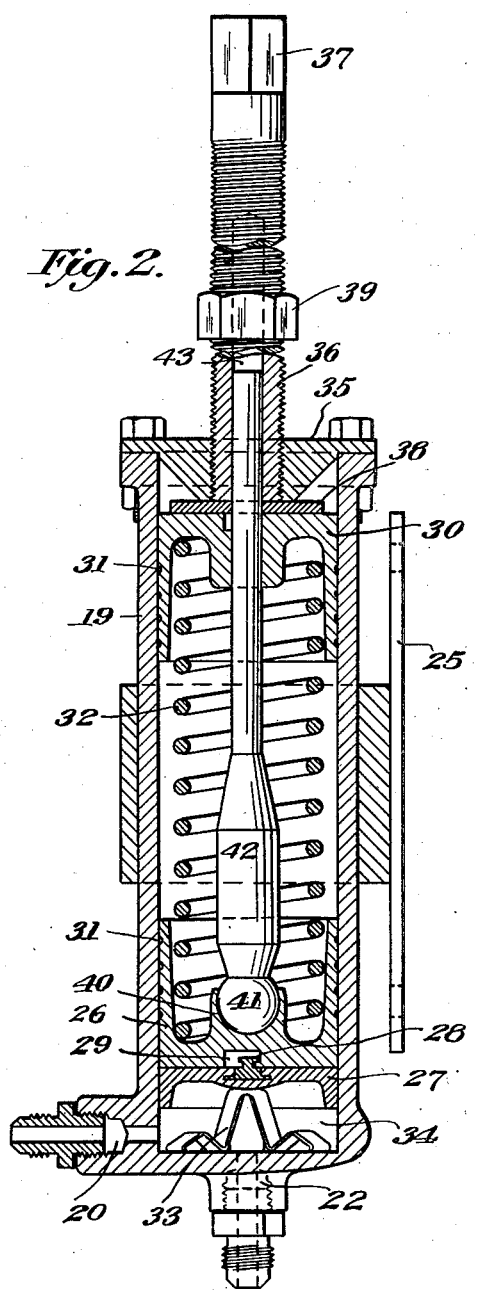
Inventors
Clarence C. Schmidt
John Louis Richter
By Victor J. Evans
Attorney Dec. 9, 1930.  C. C. SCHMIDT ET AL  1,784,547
HYDRAULIC BRAKE MECHANISM
Filed May 5, 1928   3 Sheets-Sheet 2

Inventor
Clarence C. Schmidt
John Louis Richter
By Victor J. Evans
Attorney

Dec. 9, 1930.  C. C. SCHMIDT ET AL  1,784,547
HYDRAULIC BRAKE MECHANISM
Filed May 5, 1928   3 Sheets-Sheet 3
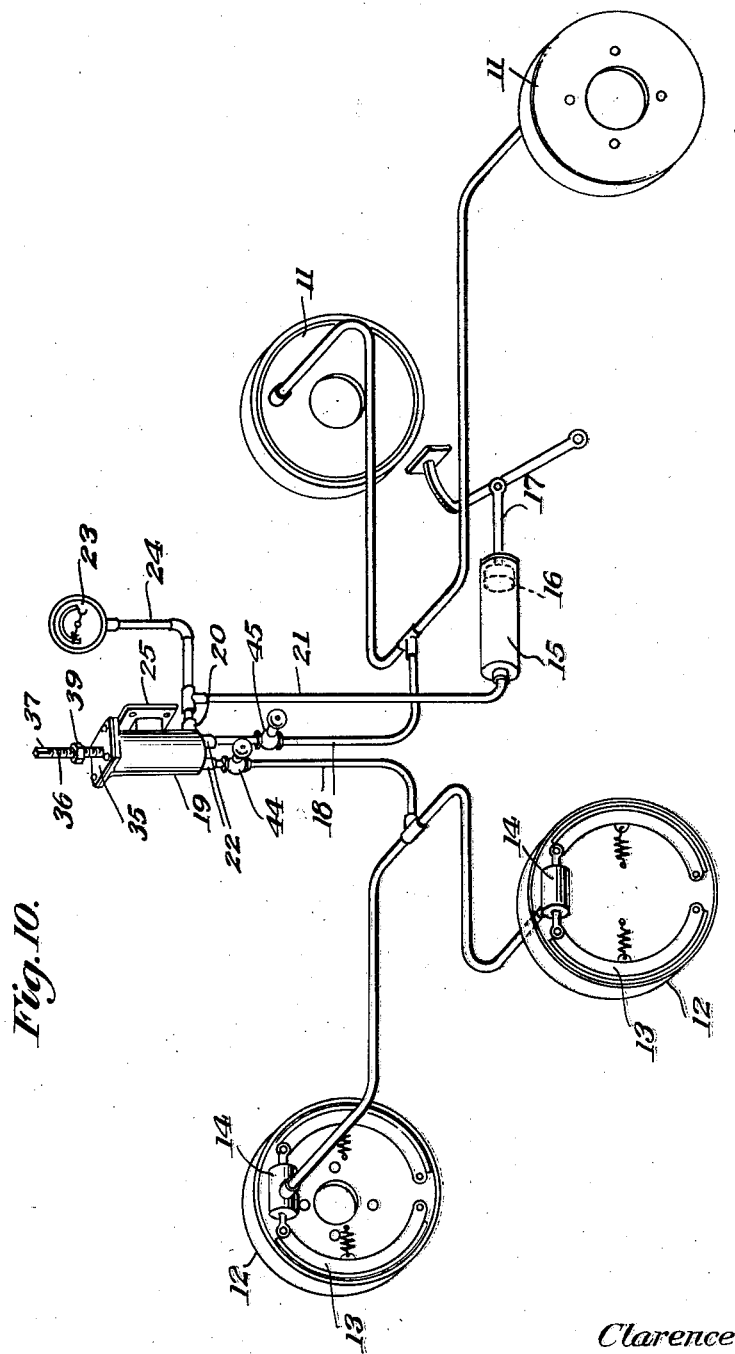
Clarence C. Schmidt
John Louis Richter
INVENTOR
BY Victor J. Evans
ATTORNEY Patented Dec. 9, 1930

1,784,547

UNITED STATES PATENT OFFICE

CLARENCE CARL SCHMIDT, OF REYNOLDSBURG, AND JOHN LOUIS RICHTER, OF BEXLEY, OHIO

HYDRAULIC BRAKE MECHANISM

Application filed May 5, 1928. Serial No. 275,365.

This invention relates to improvements in hydraulic braking systems especially adapted for automobiles.

An object of the present invention is to provide means to compensate for pressure in excess of the amount necessary to effectually operate the brakes, and thus reduce danger of bursting the reserve reservoir, and danger of blowing out the packings of the system connections.

Another object of the invention is the provision of means for effecting a harder pressure upon the brake drums of the rear wheels of a four wheel system when the brakes are initially applied, and for thereafter equalizing the pressure and eliminating danger of the front wheels responding to the braking action before the rear wheels.

Another object of the invention is the provision of means for selectively cutting out either of the front wheel brakes, or the rear wheel brakes in the event of leakage or damage.

Another object of the invention is the provision of means whereby the braking effect of the system may be tested while the vehicle is stationary.

With the above and other objects in view, the invention further includes the following novel features and details of construction, to be hereinafter more fully described, illustrated in the accompanying drawings and pointed out in the appended claim.

In the drawings:—

Figure 1 is an elevation of a compensating or equalizing device constructed in accordance with the invention.

Figure 2 is a longitudinal sectional view of the same.

Figure 10 is a diagram illustrating the manner of connecting the compensating cylinder in the system.

Figure 3:
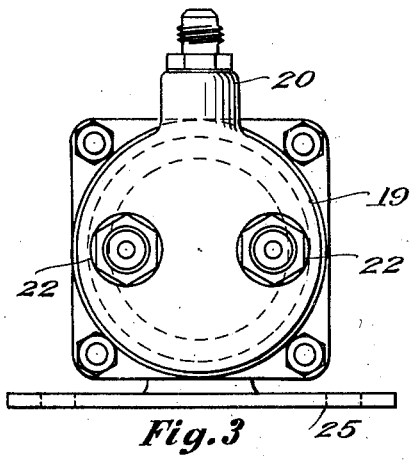
Figure 3 is an end view.
Figure 4:
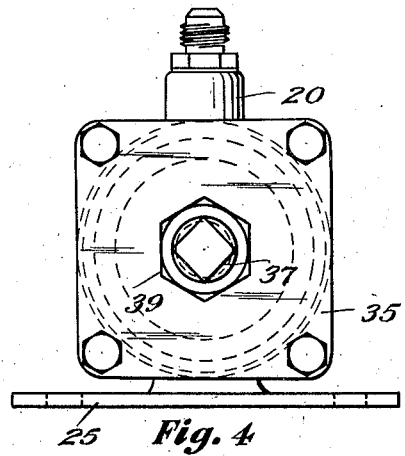
Figure 4 is a similar view looking at the opposite end of the device.
Figure 5:
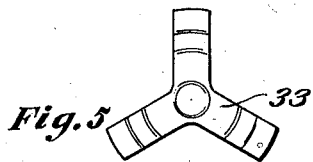
Figure 5 is a detail view of the spacing member.
Figure 6:
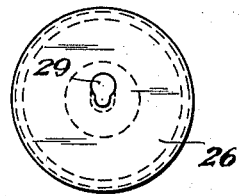
Figure 6 is a face view of the plunger.
Figure 7:
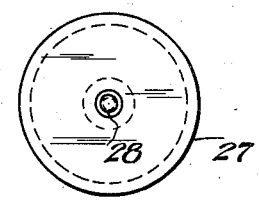
Figure 7 is a like view of the plunger carried disk.
Figure 8:
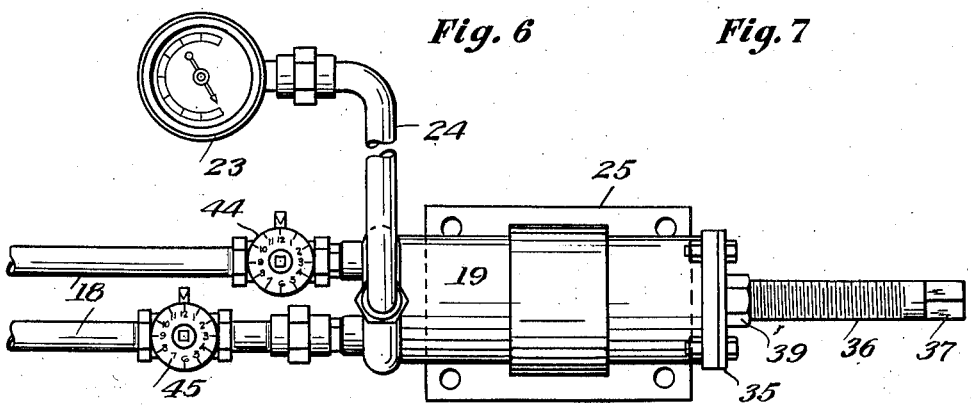
Figure 8 is an elevation of the equalizing or compensating device connected with the distributing tubes and showing the pressure gauge.
Figure 9:
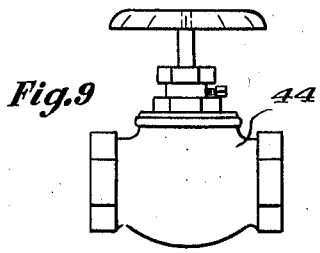
Figure 9 is a detail elevation of one of the controlling valves.

Referring to the drawings in detail wherein like characters of reference denote corresponding parts, the reference character 11 indicates the rear brake drums and 12 the front brake drums of the braking mechanism of an automobile. These drums are provided with braking elements 13 which are hydraulically operated, the reference character 14 indicating the braking cylinders for these elements. Fluid under pressure is supplied to the braking cylinders from a master or brake operating cylinder 15. This cylinder houses a piston 16 whose rod 17 is connected in a suitable manner with the brake pedal so that the fluid within the cylinder and within the distributing tubes 18 of the system will provide a sufficient pressure to operate the brakes. The foregoing construction may be of the usual or any preferred type.

In carrying out the present invention use is made of a compensating or equalizing cylinder 19. This cylinder is provided with an inlet port 20 which is connected by means of a pipe or tube 21 with the brake operating or master cylinder 15. The cylinder 19 is also provided with spaced distributing ports 22 which are connected with the distributing pipes 18. A pressure gauge 23 is connected with the port 20 by means of a tube or pipe 24.

The cylinder 19 may be carried by a suitable bracket 25 and mounted in a suitable position, and movable within this cylinder is a plunger 26. This plunger has detachably connected thereto a disk 27 and for this purpose this disk is provided with a headed extension 28 which is engaged within a keyhole socket 29 provided in the end of the plunger 26. Also located within the cylinder 19 is a head 30 and this head and the plunger 26 may be provided with annular oil grooves 31. The plunger 26 and the head 30 are hollow and receive the opposite ends of a spring 32 which yieldingly forces the plunger and head in opposite directions, movement of the plunger in one direction being limited by a spacing member 33. The head is thus held spaced from the adjacent end of the cylinder so as to provide a fluid chamber 34.

One end of the cylinder is closed by a head 35 which is removably secured in place and this head is provided with a threaded opening for the reception of a threaded shank 36. One end of this shank is square as at 37 to receive a suitable tool, while the opposite end bears upon a plate or disk 38 which is in contact with the head 30.

By adjusting the shank 36, the position of the head 30 may be regulated so that the tension of the spring will be adjusted to control the movement of the plunger 26. A lock nut 39 may be arranged to hold the shank in adjusted position.

The plunger 26 is provided with a socket 40 which receives a ball 41 provided at one end of a rod 42. This rod extends through the head 30 and into a socket 43 provided in the shank 36 so that the latter provides a guide for the rod.

Controlling valves 44 and 45 are provided in the distributing pipes 18.

The system being supplied with fluid, operation of the piston 16 will build up pressure in the system proportionate to the degree of movement of said piston. The valves 44 and 45 are so adjusted that initially, a greater pressure will be supplied to the rear brakes than the front brakes, after which all of the brakes will be equally applied. This will prevent operation of the front brakes prior to the operation of the rear brakes. This also eliminates danger of failure of the rear brakes to operate in advance of the front brakes due to lack of traction surface for the rear wheels, as when the vehicle strikes a bump or rut as the brakes are applied. Should excessive pressure be used in applying the brakes, this excess pressure will be taken care of by the compensating cylinder. As the fluid passes through the fluid chamber 34 to the distributing pipes, excess pressure will force the plunger 26 toward the opposite end of the cylinder, the degree of movement being proportionate to the amount of pressure.

The chamber 34 will thus in effect expand proportionate to the amount of pressure in excess of that required to properly apply the brakes. By adjusting the shank 36, the position of the head 30 may be regulated so as to control the point at which the plunger 36 will act. This will prevent damage to the master cylinder or the connections in the tube line of the system, and reduce danger of leaks.

The efficiency of the brakes may be tested when the vehicle is at a standstill, by operating the brake pedal and holding the same in depressed position, the pressure being indicated on the pressure gauge. It may thus be determined whether or not the system contains the proper amount of pressure.

The elements of the compensating cylinder may be readily removed by removing the shank 36 and the head 35. The head 30 and plunger 26 with the plunger rod and spring may be removed from the cylinder and any loss of fluid may be remedied. The parts may thereafter be readily replaced.

The invention is susceptible of various changes in its form, proportions and minor details of construction and the right is herein reserved to make such changes as properly fall within the scope of the appended claim.

Having described the invention what is claimed is:—

A hydraulic braking system for vehicles comprising a pair of rear fluid operated braking elements and a pair of front fluid operated braking elements, conduits for conducting liquid to said braking elements, a cylinder having a pair of ports in one end, one of said ports being connected to the front liquid conduit and the other connected to the rear liquid conduit, valves in said conduits having means for indicating the size of the opening from the conduits to the said cylinder, a piston in said cylinder, a spring on one side of said piston, the other side of the piston being exposed to the liquid in the system, means for varying the tension of the spring, a second cylinder having a manually operable piston movable therein, a fluid conduit from the said last-named cylinder to the first-named cylinder for applying pressure to the latter, and means for indicating the pressure applied, substantially as set forth.

In testimony whereof we affix our signatures.

CLARENCE CARL SCHMIDT.
JOHN LOUIS RICHTER.